Patented Apr. 11, 1950

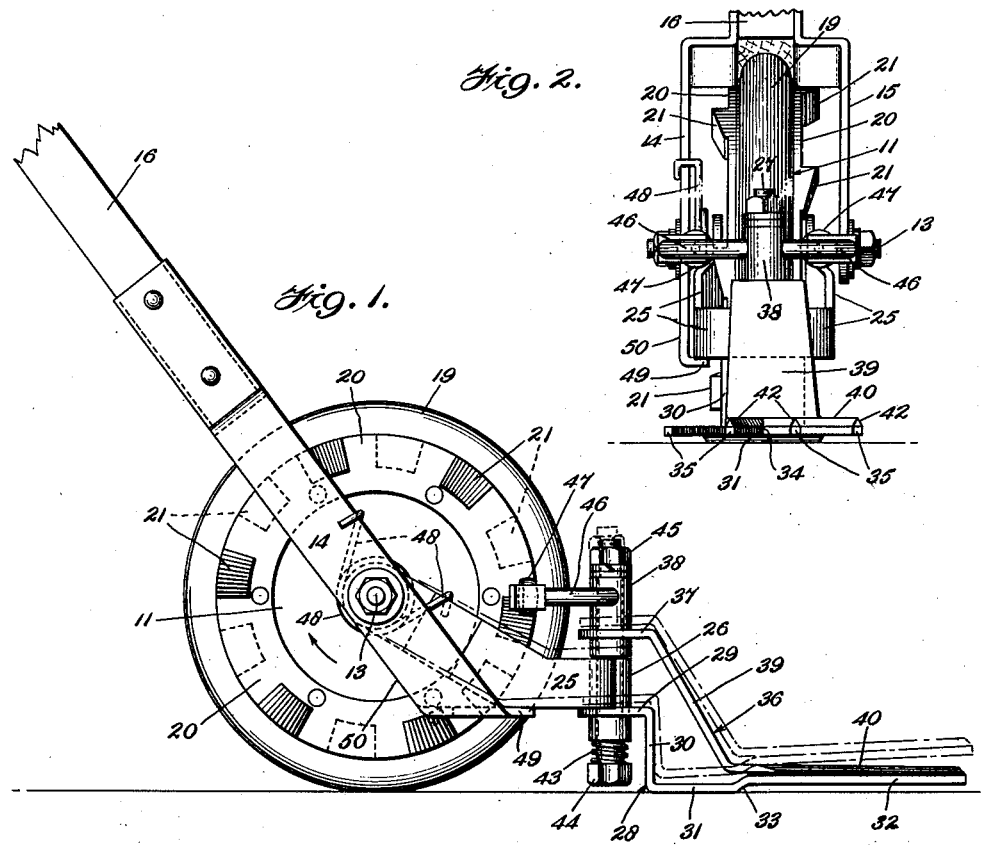
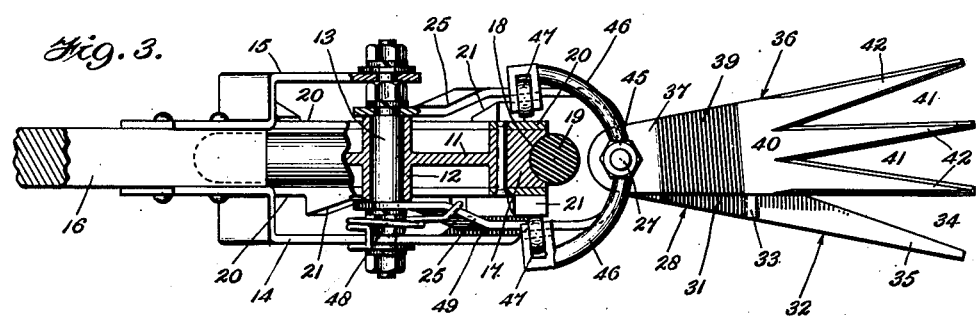

2,503,348

UNITED STATES PATENT OFFICE 2,503,348

LAWN TRIMMER OR EDGER

Arthur E. Miller, Milwaukee, Wis.

Application December 4, 1946, Serial No. 714,035

3 Claims. (Cl. 56—257)

The invention relates to lawn trimmers and has for its principal object the provision of a relatively simple and inexpensive apparatus of this character which is especially adapted for the trimming of the edges of lawns along copings or walls, beneath plants, around trees and flower beds, etc.

With this and other objects in view, which will appear as the description proceeds, the invention resides in the novel details of construction, and the novel combinations and arrangements of parts, more fully hereinafter disclosed and particularly pointed out in the appended claims.

Briefly, the machine comprises an oscillatory serrated shear blade which is movable back and forth in resiliently tensioned shearing engagement with a relatively fixed serrated shear blade, the oscillations of the movable blade being secured through motion translating mechanism operable by a ground engaging wheel which supports the device for travel over the lawn. The shear blades are disposed substantially parallel to and closely adjacent the ground, whereby spears or tufts of grass growing in sidewalk or coping joints or cracks may be cut substantially flush with the surface; and the blades are carried by a resiliently biased frame which is pivotally mounted on the wheel axle for floating movements, whereby to accommodate unevenness of the ground surface and protect the shear blades against being inadvertently driven into the ground, with possible consequent damage.

In the accompanying drawing forming a part of this specification there is shown one form of lawn trimmer embodying the principles of the invention, it being understood however that this illustration is for purposes of disclosure only and that the details of construction and precise arrangement of parts may be varied within the scope of the claims, without departing from the spirit of the invention.

In the said drawing:

Figure 1 is a side elevational view of the trimmer;

Fig. 2 is a front elevational view thereof, as seen from the right of Fig. 1; and Fig. 3 is a top plan view, partly broken away and in section.

Referring to the drawing more in detail, the machine as here shown comprises a single supporting wheel 11 the hub 12 of which is journalled on an axle 13 which is carried by the companion offset strap members 14 and 15 to the upper portions of which is secured a tongue or handle 16 whereby the machine may be traversed over the ground. The rim 17 of the wheel 11 has a circumferential groove 18 in its periphery, in which groove is seated a resilient tire 19; and to each side face of the rim portion 17 there is secured an annulus 20 carrying a circumferential series of laterally projecting lugs or cams 21. The cams of the respective annuli are circumferentially staggered relative to one another, as will be readily understood from Fig. 1.

A pair of laterally spaced forwardly extending arms 25 have their rearward end portions journalled on the axle 13 while their forward ends are welded or otherwise rigidly secured to a vertically disposed sleeve 26 in which is slidably mounted a spindle 27. A fixed shear member 28 has its rearward portion 29 rigidly secured to the said sleeve, and is offset downwardly as at 30 to bring the heel portion 31 of the shear blade proper to substantially ground level. The forward or toe portion 32 of this blade is slightly offset upwardly, as at 33, and is provided with V-shaped notches or serrations 34 to provide a plurality of cutting teeth 35.

A movable shear member 36 is superposed on the fixed shear member 28 and has its rearward portion 37 rigidly attached to a sleeve 38 which is journalled on the spindle 27 above the sleeve 26. The movable shear member has an inclined portion 39 extending forwardly and downwardly from said rearward portion 37, and the movable shear blade 40 extends forwardly from the lower end of the inclined portion 39. The blade portion 40 is notched or serrated as at 41 to provide cutting teeth 42 complementing the teeth 35 of the fixed shear blade. A coiled compression spring 43, interposed between the head 44 of the spindle 27 and the lower end of the sleeve 26, constantly urges the said spindle downwardly and maintains tensioned shearing engagement between the shearing portions 32 and 40 of the respective blade members. The movable shear member is preferably so formed that its toothed shearing portion 40 is slightly out of parallel with the companion portion 32 of the fixed shear member, as shown in Fig. 1, whereby in conjunction with the spring 43 effective shearing action throughout the length of the cutting edges of the teeth 35 and 42 may be obtained at all times. The force exerted by the spring 43 may be varied as conditions require, through adjustment of a nut 45 threaded on the upper end of the spindle 27.

The sleeve 38 of the movable shear member carries a pair of curved arms 46 providing a fork which straddles the rim portion of the wheel 11, and the free ends of these arms carry rollers 47 disposed for engagement alternately by the staggered cams 21 carried by the wheel. Thus, as the machine is traversed over the ground, rotation of the wheel will oscillate the fork and move the shear blade 40 back and forth relative to the blade 32.

A torsion spring 48, the ends of which are engaged with the strap member 14 and the adjacent pivoted arm 25 respectively, provides a yieldable connection between the handle 16 and the floating shear frame, and tends to maintain engagement between said arm and a lateral projection or toe 49 carried by an extension 50 of the said strap member.

By reason of their disposition in proximity to the ground, the shear blades may cut the grass substantially flush with the ground surface, which is of material advantage in clipping tufts growing in cracks or joints in copings, walk pavements, etc. However, because the shear blades are so closely adjacent the ground, if they were carried by integral extensions of the handle straps 14 and 15, or were otherwise rigidly mounted relative to the handle 16, as in prior machines of this character, should the handle be inadvertently elevated beyond the normal operating inclination shown in Fig. 1, or should the operator exert abnormal downward pressure on the machine in an effort to secure better traction for the cutting of tough or unusual material, the shear members would be depressed and caused to penetrate the ground, with probable consequent damage. This possibility is obviated in the present construction, since the shear blades are carried by the floating frame comprising the pivoted arms 25 and sleeve 26, which will yield in either of the above mentioned contingencies and prevent the shear points from being forced into the ground.

Furthermore, with the handle 16 at its normal inclination, should the heel 31 of the fixed blade member encounter a slight elevation or unevenness in the ground surface, the floating shear frame and blades will pivot upwardly against the action of spring 48, as indicated in broken lines in Fig. 1, and thus readily pass over the obstruction. Should an obstruction be encountered which can not be thus cleared, or should it be desired to increase the height of the cut, the inclination of the handle 16 may be merely lessened somewhat, whereupon the lug 49 of the strap member 14 will elevate the shear frame and blades to the necessary or desired degree.

What is claimed is:

1. A lawn trimmer, comprising a ground engaging wheel; an axle mounting said wheel; handle means for traversing the machine over the ground, mounted on said axle for vertical swinging movements; a shear frame mounted on the axle for vertical oscillation independently of said handle means; a fixed shear blade carried by said frame adjacent the ground in advance of said wheel, said blade having an offset heel portion for engagement with the ground; a second shear blade mounted on said frame for oscillatory movements in co-operative relation to said first blade; resilient means urging said frame and blades toward their lowered position; means carried by said handle means for engagement with said frame upon abnormal depression of the handle means, whereby the frame and blades may be elevated; and motion translating means operable by said wheel to oscillate said second blade.

2. In an edge trimmer for lawns, the combination of a ground engaging wheel provided with a plurality of arcuately spaced cams; an axle journalling said wheel; a traversing handle mounted on the axle and swingable about the axis thereof; a shear frame oscillatably mounted by the axle and extending forwardly of the wheel; a vertical spindle carried by the forward portion of said shear frame; a fork structure journalled on said spindle for horizontal movements and having means engageable with said wheel cams whereby rotation of the wheel may oscillate the fork; a narrow, toothed shear blade fixedly secured to and extending forwardly from said frame in longitudinal alinement with said wheel and in proximity to the ground; a ground-engaging heel carried by the rearward portion of said blade for preventing contact of the forward portion of the blade with the ground surface; a second narrow, toothed shear blade vertically movably superposed on said fixed blade in slightly non-parallel relation thereto and oscillatable thereover by said fork structure; and a single spring means exerting force solely upon a longitudinal axial portion of said second blade to maintain yieldable tensioned shearing engagement between the blades irrespective of the position of the shear frame and handle.

3. In an edge trimmer for lawns, the combination of a ground engaging wheel provided with a plurality of arcuately spaced cams; an axle journalling said wheel; a traversing handle mounted on the axle and swingable about the axis thereof; a shear frame oscillatably mounted by the axle and extending forwardly of the wheel; interengageable stop means on the handle and shear frame for limiting relative movement between them in one direction; spring means connecting the handle and frame and yieldably maintaining engagement of said stop means whereby the handle and frame normally move as a unit; a vertical spindle carried by the forward portion of the shear frame; a fork structure journalled on said spindle for horizontal movements and having means engageable with said wheel cams whereby rotation of the wheel may oscillate the fork; a toothed shear blade fixedly secured to and extending forwardly from said frame in proximity to the ground; a ground engaging heel adjacent the rearward portion of said blade for preventing contact of the forward portion of the blade with the ground surface; a second toothed shear blade vertically movably superposed on said fixed blade in slightly non-parallel relation thereto and oscillatable thereover by said fork structure; and spring means acting upon said second blade to maintain yieldable tensioned shearing engagement between the blades.

ARTHUR E. MILLER.

REFERENCES CITED

The following references are of record in the file of this patent:

UNITED STATES PATENTS

| Number | Name | Date |
|---|---|---|
| 86,960 | Wilde | Feb. 16, 1869 |
| 89,981 | Garrick | May 11, 1869 |
| 421,430 | Phillips | Feb. 18, 1890 |
| 700,173 | Cliffton | May 20, 1902 |
| 2,155,183 | Dursch | Apr. 18, 1939 |